Dec. 1, 1964  H. L. McCOMBS, JR  3,159,000
GAS TURBINE LOAD SHARING SYSTEM
Filed April 30, 1963
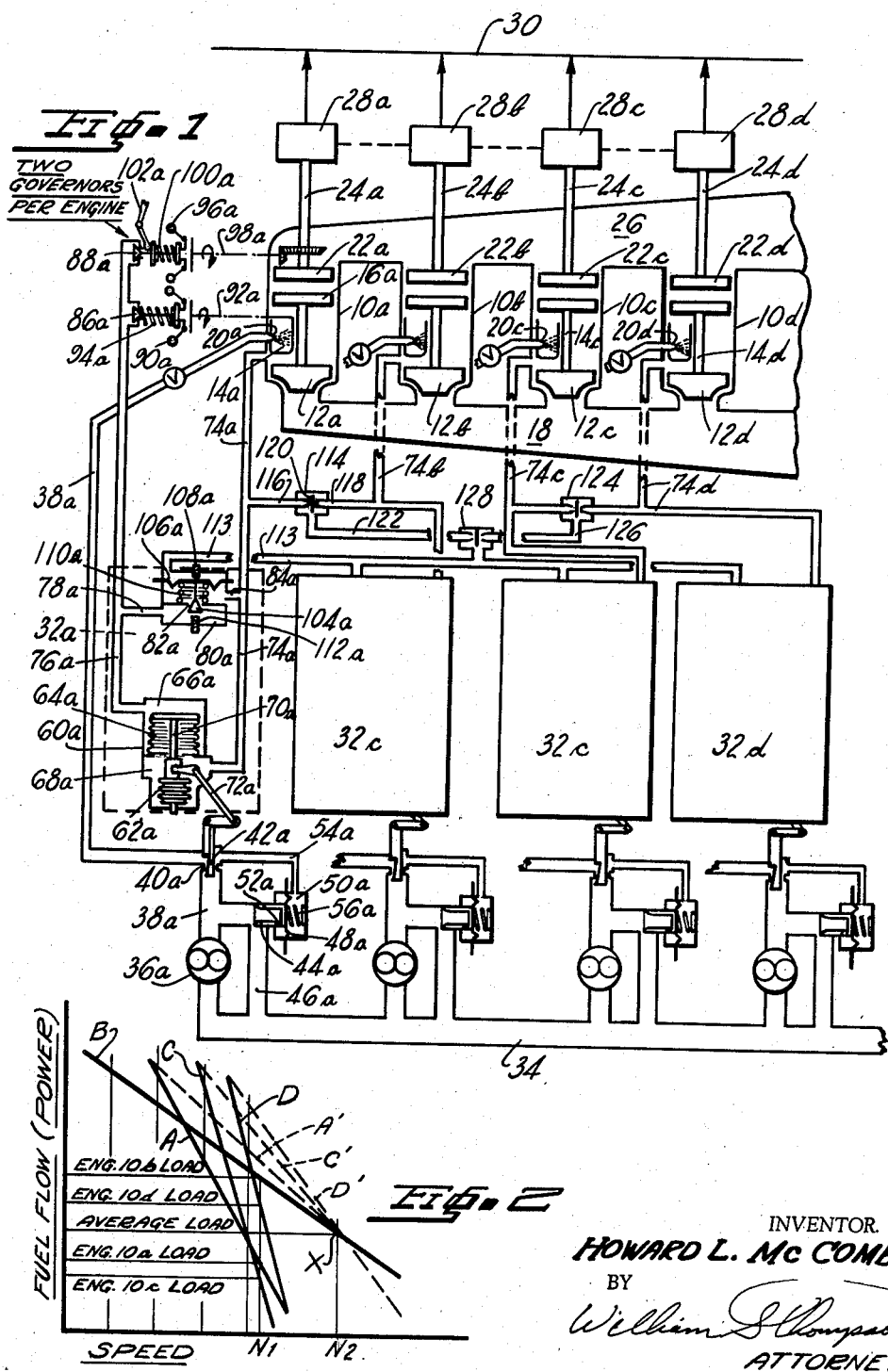
INVENTOR.
HOWARD L. McCOMBS, Jr.
BY
William S. Thompson
ATTORNEY

United States Patent Office 3,159,000
Patented Dec. 1, 1964

3,159,000
GAS TURBINE LOAD SHARING SYSTEM
Howard L. McCombs, Jr., South Bend, Ind., assignor to The Bendix Corporation, South Bend, Ind., a corporation of Delaware
Filed Apr. 30, 1963, Ser. No. 276,775
7 Claims. (Cl. 60—39.15)

The present invention relates to a load sharing system for a plurality of gas turbine engines particularly of the shaft output type hereinafter referred to as turbo-shaft engines. More particularly the invention applies system responsive corrective adjustments to individual engine speed governors so that all engines within a bank of engines driving a given load will supply substantially equal shares of the power requirements.

In order to assure maximum power capability, uniformity of wear and/or deterioration, and balanced loading it is desirable in many multiple power plant installations that each engine bear a substantially equal portion of the load.

When the engine outputs are not interconnected in a physical sense, the respective engine speed governors are able by small variations in speed between respective engines to make large compensating adjustments in engine load and thus maintain a close approach to load uniformity. However, for engines of the turbo-shaft type wherein the output shafts drive a common load and thus are physically connected one to another so as to rotate at equal speeds or speeds having a fixed ratio one to another, it is no longer possible to correct for load inequities by relative speed variations between engines. Under this condition, certain engines within a bank driving a common load will assume greatly disproportionate shares of the overall load and relative corrections via speed adjustments is not possible since all speeds will vary in unison.

Accordingly it is an object of the present invention to provide a load sharing control system whereby adjustments to selected engines in a bank of engines driving a common load may be made whereby all engines will bear a substantially equal share of the load.

It is another object of the present invention to provide control means for comparing the load produced by each given engine in a bank against the load supplied by the maximum producing engine and to correct load distribution based on this comparison.

It is a still further object of the present invention to provide means to adjust governor slope characteristics of individual engine governor controls within a bank of engines to correct load inequities.

Other objects and advantages will become apparent on consideration of the following description and drawings wherein:

FIGURE 1 is a schematic drawing of a multiple turbo-shaft engine installation including fuel and load distribution control means in accordance with the teachings of the present invention; and FIGURE 2 is a graph illustrating governor slope characteristics of the individual engines of FIGURE 1 before and after adjustment by my load sharing control system.

Referring in particular to FIGURE 1, there is shown a multiple engine installation having a plurality of turbo-shaft gas turbine engines 10a, 10b, 10c and 10d. Four engines have been illustrated, however, it should be understood that the present invention may be applied to any installation of two or more engines.

The engines shown are of the turbo-shaft type (i.e. gas turbine engine with shaft output). Engine 10a, which is the same as the remaining engines in the bank, includes a gas producing section having a compressor 12a, a combustion chamber 14a, and a compressor driving first turbine 16a. Air is received from inlet manifold 18, compressed in compressor 12a, burned with a fuel mixture supplied by nozzle 20a in combustion chamber 14a to produce high energy content motive fluid which passes through turbine 16a which extracts a portion of the energy content sufficient to drive the compressor. The engine further includes a power output section which receives the high energy content motive fluid from the gas producing section and converts this energy to a rotational shaft output. The power output section consists of an output turbine 22a drivably connected to output shaft 24a. Turbine 22a extracts substantially the balance of usable energy in the motive fluid and exhausts the spent gases to exhaust manifold 26. Similar parts of engines 10b, 10c and 10d bear the same numerical designation as those described for engine 10a except that the letter subscript is changed.

Although not necessarily limited thereto, the present invention has its greatest utility applied to multiple power plant installation where the engines are driving a common load. This is illustrated schematically by a series of load devices 28a–28d having interconnection represented by the line 30 so that each speed of respective shafts 24a–24d is equal to one another or bears a fixed ratio thereto. The load devices may for example, be a series of generators supplying power to a common line wherein the generators are physically interconnected by common gearing or are electrically interconnected by means well known in the art. Additionally, it is common practice to apply two engines to a common gear box in helicopter aircraft for added reliability wherein engine output shafts are physically connected and must rotate at the same speed.

Each engine has a fuel control system 32a–32d respectively. The fuel supplying systems may be identical and function in the manner to be described with respect to system 32a.

Fuel from a supply tank or boost pump, not shown, is transmitted by conduit 34 to high pressure pump 36a which is preferably engine driven. High pressure fuel is delivered by pump 36a to conduit 38a which connects said pump to the fuel delivery nozzle 20a. A fuel metering restriction 40a is disposed in conduit 38a and is operative with an axially movable contoured metering valve 42a to define a variable area metering orifice. A by-pass valve 44a is operative to maintain a constant pressure differential across metering restriction 40a by by-passing fuel through conduit 46a from the outlet side of the pump back to its inlet side. By-pass valve 44a is controlled by spring loaded diaphragm 48a contained in chamber 50a. Pressure from upstream of metering restriction 40a passes through a port 52a in the sidewall of valve 44a to act in one direction on diaphragm 48a whereas pressure downstream of metering restriction 40a is transmitted by conduit 54a to the opposed side of diaphragm 48a so that the metering head or pressure differential is applied as a controlling input to valve 44a. A predetermined pressure differential is required to balance the preload of diaphragm spring 56a. Should the pressure differential tend to increase above this predetermined value it will overcome the spring, by-passing more fuel to pump inlet and restoring the pressure differential to its predetermined value. Should the pressure differential decrease, valve 44a will close restricting the quantity of by-passed fuel and raise the pressure differential.

By maintaining pressure differential constant, the rate of fuel delivery through conduit 38a to nozzle 20a becomes a sole function of the axial position of contoured metering valve 42a and thus provides a fuel system of relative simplicity where only one variable controls fuel delivery rate. Valve 42a is controlled in position by a positioning signal supplied by fuel system 32a which in the preferred embodiment is a pneumatic control of the type described in commonly assigned U.S. Patent 3,040,529, James E. Hurtle, inventor, and issued June 26, 1962 modified to include components to effect load sharing in accordance with the teachings herein. The control consists of a housing 60a containing a small evacuated bellows 62a secured on one end to the wall in the lower end of housing 60a and a large open bellows 64a peripherally secured to the housing side walls to divide said housing into a first chamber 66a and a second chamber 68a, the latter chamber containing bellows 62a. Bellows 62a and 64a have their movable ends interconnected by a rod 70a which is thereby moved axially in response to the sum of difference of pressure forces acting on the bellows. Rod 70a is connected via linkage 72a to metering valve 42a to transmit this motion thereto and effect variation of fuel delivery.

Compressor discharge pressure (or combustion chamber inlet pressure) is supplied by conduit 74a from engine 10a to chamber 68a where it acts over the exterior surface of bellows 62a and the interior surface of bellows 64a. This pneumatic engine pressure is also supplied to chamber 66a via conduit 76a, conduit 78a, housing 80a having an orifice or restriction 82a, and conduit 84a which connects with the source pressure 74a. Conduit 76a extends beyond its connection with conduit 78a and terminates with a pair of governor controlled exhaust valves 86a and 88a which when open exhaust to the atmosphere. Exhaust valve 86a is controlled by an overspeed governor 90a driven via connection 92a at a speed proportional to the gas producer section or turbine 16a and compressor 12a. Governor 90a operates against the force of spring 94a to open exhaust valve 86a when the gas producer speed exceeds a predetermined maximum safe value. Exhaust valve 88a is controlled by an all-speed or adjustable governor 96a driven by power turbine 22a via connection 98a and which opposes spring 100a which is adjustable by means of throttle lever 102a. Governor 96a is operative to open exhaust valve 88a when the speed of turbine 22a approaches a value determined by the force of spring 100a. This speed value is adjustable to any desired value by lever 102a.

The control system thus far described is in accordance with that of Patent 3,040,529 which contains a full description of the operation thereof. Summarizing this operation, during engine acceleration turbine 16a is below its limiting speed and turbine 22a below its requested speed so that both exhaust valves 86a and 88a are closed. Under this condition there is no air flow through restriction 82a and consequently no pressure drop thereacross so that pressure in chamber 66a equals that in chamber 68a neutralizing bellows 64a. Compressor discharge pressure acting on bellows 62a is the effective force to position metering valve 42a in a gradually opening direction as engine acceleration proceeds and compressor pressure increases. As turbine 22a approaches its selected speed, governor 96a will urge exhaust valve 88a in an open direction causing flow through restriction 82a and a resulting pressure drop thereacross thus lowering the pressure in chamber 66a below that in chamber 68a. Decreasing pressure in chamber 66a causes large bellows 64a to become an effective controlling member opposing bellows 62a. Since bellows 64a is relatively large compared to bellows 62a and exhaust valve 88a is quite sensitive causing a large pressure drop across restriction 82a, bellows 64a becomes the predominate control overriding bellows 62a and causing fuel valve 42a to move upwardly in a fuel decreasing direction. It will be noted that an increase of speed of turbine 22a induces a decrease in fuel to provide the inverse relationship of fuel vs. speed required for dynamic governing. During deceleration, throttle 102a is retarded thus relaxing spring 102a. The engine will momentarily be at an overspeed condition with exhaust valve 88a in its wide open position. This causes a relatively fixed pressure differential across bellows 64a which is subtractive from the force on bellows 62a which in net effect is equivalent to reducing the size of bellows 62a. Thus deceleration proceeds in substantially the reverse manner of an acceleration, except of course, at much lower fuel values due to the decreased effectiveness of bellows 62a.

In order to provide means for adjusting the governor independent of throttle 102a, I have provided a control valve 104a operative to control the effective area of orifice 82a in housing 80a. The valve 104a is controlled axially by diaphragm 106a peripherally secured to housing 80a. Diaphragm 106a is urged against stop 108a by spring member 110a in which position valve 104a defines a minimum effective area opening with restriction 82a. Stop 112a limits the maximum effective area size.

Variation in the effective area of orifice 82a by valve 104a varies the gain or sensitivity of the governing characteristic. During governing operation air flow will be in series through valves 104a and 88a such that adjustment to the former affects the latter. Specifically, the smaller the effective area through restriction 82a, the smaller will be the increment of position change required by valve 88a to effect a given pressure change in conduit 76a and chamber 66a. As the effective area of orifice 82a is increased, valve 88a must handle greater quantities of air and thus must move further to effect a given pressure change causing a less sensitive or low gain governor characteristic.

The proportionality or gain of the governor is referred to in technical literature in the art as the governor droop or slope which indicates the characteristic of a graph plot of speed vs. fuel flow (or power) during governing operation. Such a plot is generally a straight line curve inclined slightly from the vertical as illustrated by the curves A, B, C, D, of FIGURE 2 which are governor curves for the engines 10a, 10b, 10c and 10d respectively. The closer the approach of the governor curve to the vertical (isochronism) the greater is its slope and governor sensitivity and the less is its droop. Slope is measured from its angular deviation from a horizontal axis whereas droop would be the converse of slope or proportional to the complementary angle of the slope angle.

Control of the position of gain or slope adjusting valve 104a is by means of diaphragm 106a which is exposed to compressor discharge pressure from engine 10a over its lower surface which provides a pressure force which in cooperation with a light force from spring 110a urges diaphragm 106a against minimum stop 108a. The upper face of diaphragm 106a is exposed to the maximum compressor discharge pressure in the bank of engines supplied through a selecting network to conduit 113. Each engine has a compressor discharge pressure conduit 74a, 74b, 74c and 74d, respectively, for supplying this quantity to its respective fuel system 32a, 32b, 32c and 32d. A selecting valve 114 is connected by conduits 116 and 118 to conduits 74a and 74b and contains a valve plate 120 loosely contained between closely spaced ends of conduits 116 and 118. When the pressure in conduit 116 exceeds that in conduit 118, valve plate 120 moves to the right closing conduit 118 venting compressor discharge pressure of engine 10a to conduit 122. Should the pressure of engine 10b be greater, valve plate 120 will move to the left closing conduit 116 venting compressor discharge pressure of engine 10b to conduit 122. Thus valve 114 selects the greater of the compressor discharge pressures of engines 10a and 10b and supplies this pressure to conduit 122. A similar selector valve 124 is connected between engines 10c and 10d to supply the greater pressure to conduit 126. A third selecting valve 128 selects the greater pressure in conduits 122 and 126 and supplies the highest pressure in the bank of engines to conduit 112 where it is distributed to the respective fuel systems as a reference pressure as for example is shown in fuel system 32a where is acts on the upper surface of diaphragm 106a.

For consideration of the operation of my load sharing system, reference is made to the graph of FIGURE 2 showing four randomly oriented governor slope curves A, B, C and D for each of the respective engines. The variations between governor curves, although somewhat exaggerated for purposes of illustration, results from differences in manufacturing tolerances between engines and controls and exists in even the most closely controlled conditions. Assuming all engines are driving a common load at equal speeds $N_1$, the intersection of a vertical line drawn from $N_1$ with the governor curves indicates the fuel delivery and approximate load each engine would deliver without load sharing. As shown there is greatly disproportionate load distribution with engines 10b and 10d assuming a greater than average share whereas engines 10a and 10c are under producing.

However, corrective adjustments are applied to the respective engine governing systems by my load sharing control which has the effect of equally distributing the load as described hereinafter.

In the bank of engines described above, compressor discharge pressure will vary proportionately with engine load such that engine 10b will have the greatest pressure; engine 10d will be next; followed by engine 10a and finally engine 10c in proportion to the load distribution indicated in FIGURE 2. Pressure on the lower face of diaphragm 106a will be the relatively low pressure of engine 10a. The selecting network will supply pressure from engine 10b which is the maximum producing or master engine to conduit 112 where it is supplied to the respective fuel systems. Diaphragm 106a, for example, will thus compare the pressure derived from engine 10a against the highest pressure in the bank of engines, or in the illustrated case against the pressure of engine 10b. Diaphragm 106a is urged downwardly against the force of spring 110a increasing the effective area of restriction 82a decreasing the gain or increasing the droop of the governor characteristic as illustrated in FIGURE 2 by curve A'. Each engine governor characteristic will be correspondingly adjusted in like manner except for engine 10b which has equal pressure across its control diaphragm. Engine speed will correct to a new value $N_2$ where all governor curves intersect at the point X and each will produce a substantially average portion of the overall load. If after correction it is desired to run at speed $N_1$, the throttle lever 102a of the engine governors may be slightly retarded to restore the original speed.

In the present invention compressor discharge pressure has been selected as a preferred engine parameter for indirectly measuring relative engine power. Particularly when combined with a pneumatic fuel control of the type described herein it will be observed that no separate power sensing equipment is required, but rather this measurement may simply be tapped from an existing control sensing conduit 74a and thus for the application described is the most economic means for sensing relative power. Other engine parameters lend themselves to producing relative power comparisons with varying degrees of accuracy, response and complexity. For installations having engine output shafts driving at the same speed, a torque measurement on the output shaft may be utilized as a power comparison. The temperature drop across turbine 22a varies proportionately with power as does the speed of turbine 16a although with less accuracy. It is expected that those practicing the present invention may select the most suitable parameter based on cost and accuracy considerations as a power index without departing from the present invention defined in the appended claims.

I claim:

1. A load sharing system for a bank of two or more turbo-shaft engines driving a common load comprising: a governor device for each engine; each of said governor devices being responsive to the shaft speed of its associated engine and operative to control fuel delivery in response thereto; adjusting means for each engine; each of said adjusting means connected to its associated governor device and operative to adjust the governor controlled relationship between shaft speed and fuel flow; power sensing means for each engine; each of said power sensing means operative to produce an individual power signal representative of the power developed by its associated engine; selecting means connected to each of said power sensing means for selecting the maximum individual power signal; comparison means for each engine; each of said comparison means being connected to said power sensing means of its associated engine and to said selecting means to compare its associated engine individual power signal with said maximum individual power signal; each of said comparison means being connected to said adjusting means of its associated engine to adjust said governor device in response to deviation between said individual power signal and said maximum individual power signal.

2. A load sharing system for a bank of two or more turbo-shaft engines, each engine having a compressor and an output shaft driving a common load comprising: a governor device for each engine; each of said governor devices being responsive to output shaft speed of its associated engine and operative to control fuel delivery in response thereto; adjusting means for each engine; each of said adjusting means connected to its associated governor device and operative to adjust the governor controlled relationship between shaft speed and fuel flow; power sensing means for each engine; each of said power sensing means operative to sense compressor discharge pressure of its associated engine; selecting means connected to each of said power sensing means for selecting the maximum compressor discharge pressure sensed from said bank of engines; comparison means for each engine; each of said comparison means being connected to power sensing means of its associated engine and to said selecting means to compare compressor discharge pressure of its associated engine with the maximum compressor discharge pressure from said bank of engines; each of said comparison means being connected to said adjusting means of its associated engine to adjust said governor device in response to said pressure comparison.

3. A load sharing system for a bank of two or more turbo-shaft engines, each engine having a compressor section and an output shaft driving a common load comprising: fuel control means for each engine for controlling the rate of fuel delivery thereto; each of said fuel control means including a governor device responsive to output shaft speed of its associated engine for controlling fuel flow inversely proportional to speed of said output shaft; adjusting means for each engine; each of said adjusting means connected to its associated governor device and operative to adjust the proportionality constant or gain thereof; power sensing means for each engine; each of said power sensing means operative to sense compressor discharge pressure of its associated engine; selecting means connected to each of said power sensing means for selecting the maximum compressor discharge pressure sensed from said bank of engines; comparison means for each engine; each of said comparison means being connected to said power sensing means of its associated engine and to said selecting means to compare compressor discharge pressure of its associated engine with the maximum compressor discharge pressure from said bank of engines; each of said comparison means being connected to said adjusting means of its associated engine to adjust the gain of said governor device in response to said pressure comparison.

4. A load sharing system for a bank of two or more turbo-shaft engines, each engine having a compressor section and an output shaft driving a common load comprising: fuel control means for each engine for controlling the rate of fuel delivery thereto; each of said fuel control means including a governor device responsive to output shaft speed of its associated engine for controlling fuel flow inversely proportional to speed of said output shaft; adjusting means for each engine; each of said adjusting means connected to its associated governor device and operative to adjust the proportionality constant or gain thereof; power sensing means for each engine; each of said power sensing means operative to produce an individual power signal representative of the power developed by its associated engine; selecting means connected to each of said power sensing means for selecting the maximum individual power signal; comparison means for each engine; each of said comparison means being connected to said power sensing means of its associated engine and to said selecting means to compare its associated engine individual power signal with said maximum individual power signal; each of said comparison means being connected to said adjusting means of its associated engine to adjust said governor device in response to deviation between said individual power signal and said maximum individual power signal.

5. A load sharing system for a bank of two or more turbo-shaft engines, each engine having a compressor section and an output shaft driving a common load comprising: fuel control means for each engine; each of said fuel control means having air conduit means connected to its associated engine compressor section for a high pressure control fluid source; first and second variable position air control valves arranged in series in each of said conduit means for controlling the air pressure therethrough with said second valve downstream of said first valve; a governor device for each engine responsive to output shaft speed; each of said governor devices being connected to said second valve of its associated fuel control means for varying the position thereof in response to output shaft speed; adjusting means for each engine responsive to power comparison between its associated engine and the maximum producing engine within said bank of engines; said adjusting means being connected to said first valve of its associated fuel control means for controlling the position thereof in response to power comparison; each of said fuel control means including a pressure responsive member connected to its associated air conduit means intermediate said first and second valves; said pressure responsive member operative to vary fuel delivery to its associated engine in response to pressure sensed in said conduit means.

6. A load sharing system for a bank of two or more turbo-shaft engines, each engine having a compressor section and an output shaft driving a common load comprising: fuel control means for each engine; each of said fuel control means having air conduit means connected to its associated engine compressor section for a high pressure control fluid source; first and second variable position air control valves arranged in series in each of said air conduit means for controlling the air pressure therethrough with said second valve downstream of said first valve; a governor device for each engine responsive to output shaft speed; each of said governor devices being connected to said second valve of its associated fuel control means for varying the position thereof in response to output shaft speed; a first pressure responsive member for each engine connected to said first valve of its associated fuel control means to control the position of said first valve in response to pressures acting thereon; said first pressure responsive member being connected on one side thereof to said air conduit means of its associated fuel control means upstream of said first valve and is thereby exposed to compressor discharge pressure of its associated engine; selecting valve means connected to said air conduit means of all engines in said bank of engines and operative to select the maximum compressor discharge pressure; said selecting valve means connected to each of said first pressure responsive members on the opposed side thereof so that said first valves are positioned in response to pressure comparisons; and each of said fuel control means including a second pressure responsive member connected to its associated air conduit means intermediate said first and second valves; said second pressure responsive member operative to vary fuel delivery to its associated engine in response to pressure sensed in said air conduit means.

7. A load sharing system as claimed in claim 6 wherein said air conduit means of each engine includes a third air control valve in parallel flow relationship with said second air control valve; and speed limiting means responsive to compressor speed of its associated engine connected to said third air control valve to control the position thereof to limit compressor speed at a maximum safe value.

No references cited.